United States Patent [19]
Hasebe et al.

[11] Patent Number: 5,606,647
[45] Date of Patent: Feb. 25, 1997

[54] LASER MARKING DEVICE FOR CONTINUOUS MARKING AND FOR COMPENSATING FOR INERTIAL FORCE OF OPTICAL SCANNING DEVICES

[75] Inventors: Hiroyasu Hasebe, Hyogo; Makoto Sakai; Katsuhiko Yasui, both of Osaka, all of Japan

[73] Assignee: Keyence Corporation, Osaka, Japan

[21] Appl. No.: 351,529

[22] Filed: Dec. 7, 1994

[30] Foreign Application Priority Data

Dec. 8, 1993 [JP] Japan ................. 5-065567 U

[51] Int. Cl.$^6$ ................. G06F 15/00
[52] U.S. Cl. ................. 395/107; 358/496
[58] Field of Search ................. 395/100, 101, 395/107, 112, 111, 118; 358/505, 496, 480, 497; 347/248, 260, 480; 346/7, 762, 158

[56] References Cited

U.S. PATENT DOCUMENTS

| | | |
|---|---|---|
| 4,285,012 | 8/1981 | Ohara et al. . |
| 4,918,435 | 3/1990 | Ryouki et al. ................. 345/122 |
| 4,978,849 | 12/1990 | Goddard et al. ................. 250/235 |
| 5,201,027 | 4/1993 | Casini ................. 395/107 |
| 5,375,205 | 12/1994 | Motoyama et al. ................. 395/107 |
| 5,473,751 | 12/1995 | Ohuchi ................. 395/164 |

FOREIGN PATENT DOCUMENTS 0420198 4/1991 European Pat. Off. .

OTHER PUBLICATIONS

Patent Abstracts of Japan, vol. 14 No. 32, JP-A-01 266749 (abstract).

Patent Abstracts of Japan, vol. 7 No. 141, JP-A-58 053444 (abstract).

Primary Examiner—Edward L. Coles, Sr.
Assistant Examiner—Gabriel I. Garcia
Attorney, Agent, or Firm—Sughrue, Mion, Zinn, Macpeak & Seas

[57] ABSTRACT

A laser marking device for describing geometric forms such as characters and symbols including at least one line element on a surface that is being irradiated with laser light for two-dimensional scanning, comprises: a laser source; scanning optics for allowing the laser light from the laser source to be deflected two-dimensionally; and a control system for controlling both the ON/OFF operation of the laser source and the deflecting operation of the scanning optics. The control system includes ROM which stores graphic data on the line elements, CPU which retrieves the graphic data from ROM and constructs a command for graphic description, GDC which receives the command and constructs both coordinate data on a plurality of points of locus and laser ON/OFF data, and line memory which, in response to a WRITE command from GDC, receives the coordinate data and laser ON/OFF data while outputting the former to the scanning optics and the latter to laser source at a given speed.

9 Claims, 12 Drawing Sheets

FIG. 11A PRIOR ART
FIG. 11B PRIOR ART
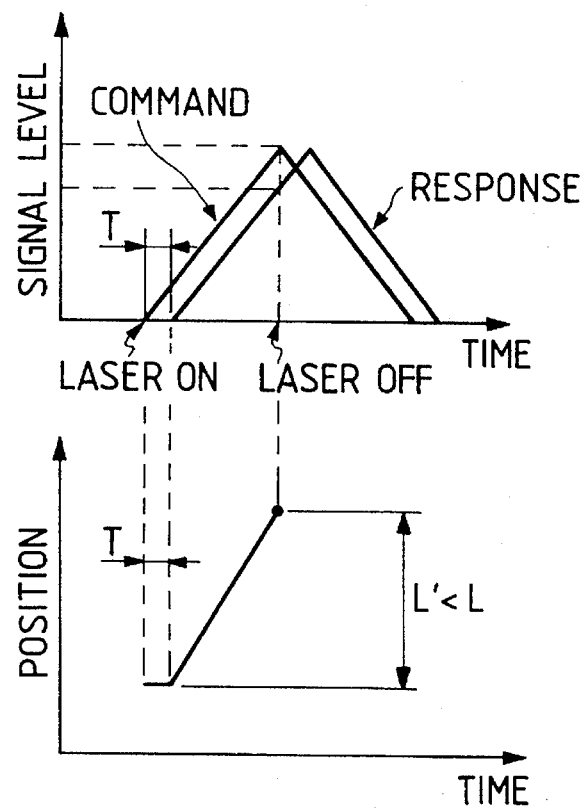
FIG. 12A
FIG. 12B
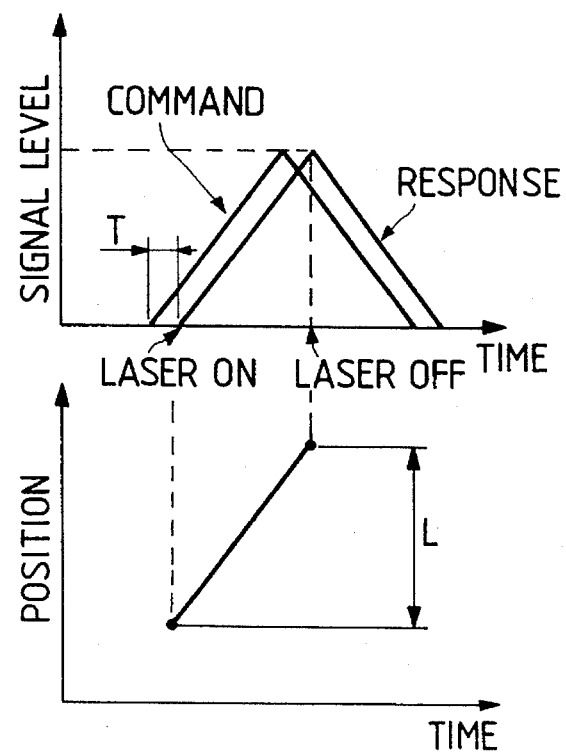

FIG. 13A
PRIOR ART
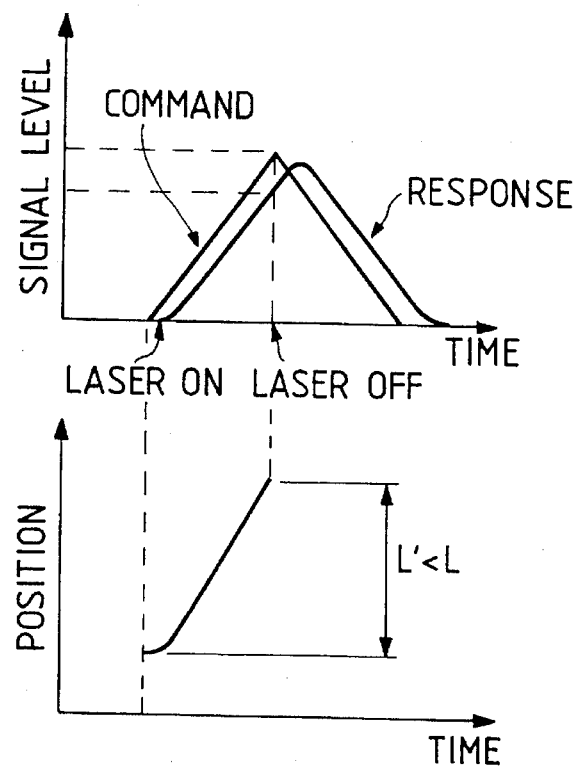
FIG. 13B
PRIOR ART
FIG. 14A
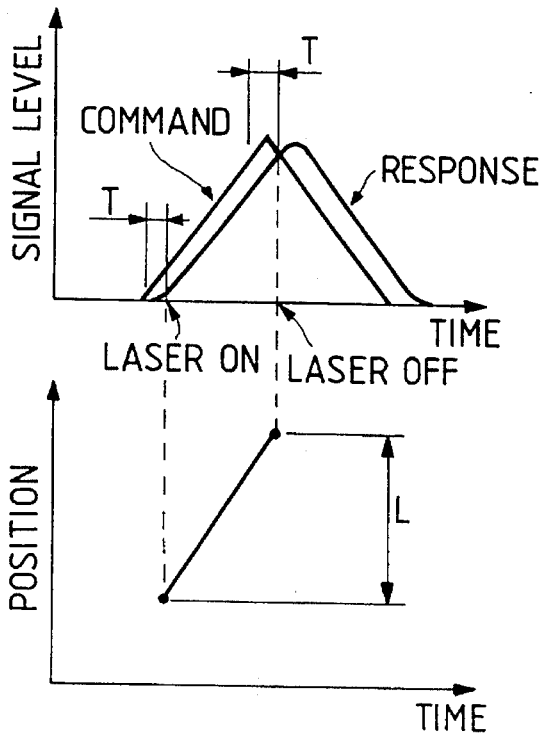
FIG. 14B

| COORDINATE | LASER ON/OFF | KIND OF LINE |
|---|---|---|
| [1] – [2] | OFF | STRAIGHT LINE |
| [2] – [3] | ON | STRAIGHT LINE |
| [3] – [4] | OFF | STRAIGHT LINE |
| [4] – [5] | OFF | STRAIGHT LINE |
| [5] – [6] | OFF | STRAIGHT LINE |
| [6] – [7] | ON | STRAIGHT LINE |
| [7] – [8] | OFF | STRAIGHT LINE |
| [8] – [9] | OFF | STRAIGHT LINE |
| [9] – [10] | OFF | STRAIGHT LINE |
| [10] – [11] | ON | STRAIGHT LINE |
| [11] – [12] | OFF | STRAIGHT LINE |
| [12] | – | END |

2 ROM

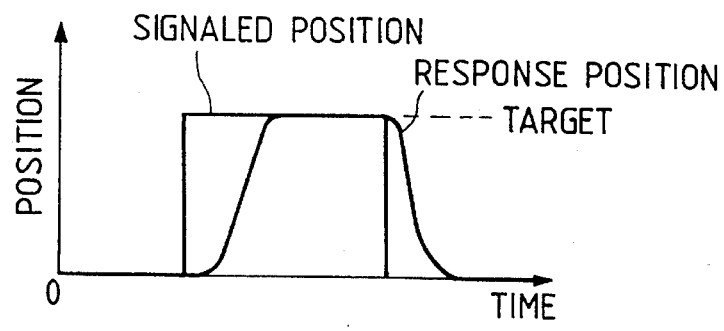
FIG. 19A
PRIOR ART
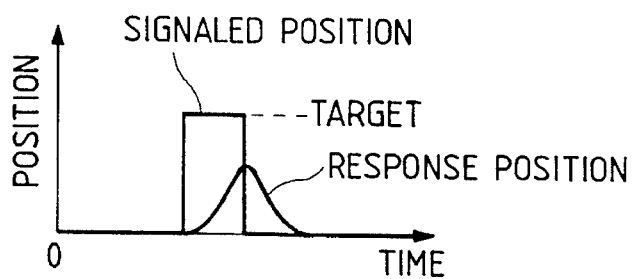
FIG. 19B
PRIOR ART
FIG. 20A
PRIOR ART
FIG. 20B
PRIOR ART
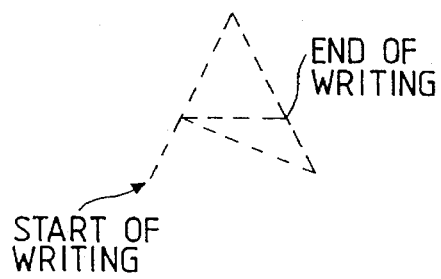
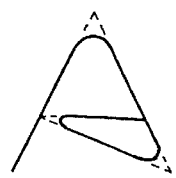

LASER MARKING DEVICE FOR CONTINUOUS MARKING AND FOR COMPENSATING FOR INERTIAL FORCE OF OPTICAL SCANNING DEVICES

BACKGROUND OF THE INVENTION

1. Field of Invention

The present invention relates to a laser marking device for describing geometric forms or figures on a surface that is being irradiated with laser light using two-dimensional scanning.

2. Description of Prior Art

Laser marking devices are known that apply laser light onto the surface of an object so that it is worked for the description of geometric figures and characters. An example of such laser marking device is shown in FIG. 5, which comprises a $CO_2$ laser 28 as a laser source, an X-axis scanner 26 and a Y-axis scanner 27, allowing the laser light from the $CO_2$ laser 28 to be deflected two-dimensionally, and a computer system 20 for controlling both the ON/OFF operation of the $CO_2$ laser 28 and the deflecting operation of the two scanners 26 and 27.

A CPU 21 in the computer system 20 executes the computer program stored in a ROM 22 and constructs coordinate data to be supplied to the X-axis scanner 26 and the Y-axis scanner 27, and supplies a laser ON/OFF control signal to be supplied to the $CO_2$ laser 28.

One way to construct the coordinate data is described below with reference to an exemplary case of describing a geometric form that comprises a straight line element A–B and a circular arc line element B–C as shown in FIG. 6. A circle is dealt with as a special case of an ellipse where its major and minor axes coincide with each other. ROM 22 registers not only the coordinates $(X_1, Y_1)$ for the start point of line element A–B, $(X_2, Y_2)$ for the end point of line element A–B or for the start point of line element B–C, $(X_3, Y_3)$ for the end point of line element B–C, the coordinates $(X_4, Y_4)$ for the center of the ellipse and R as the length of the major axis or minor axis of the ellipse, but also the kind of the line each element forms a part (i.e., whether it is a straight line, an ellipse or the like). Coordinate data for a number of points on the straight line or the arc of a circle that connect the start and end points of each graphic element are computed by software-based arithmetic operations.

Another way to construct the coordinate data is to compute preliminarily the coordinate data for a number of points that constitute each graphic element, register them in a memory like ROM 22, and retrieve them from the memory when describing a geometric form.

However, the conventional laser marking devices have had the following problems.

The first problem concerns the computation of coordinate data. The first of the two methods described above has had the disadvantage of taking an unduly long time to perform the software-based arithmetic operations. Further, according to this method, the X-axis scanner 26 and the Y-axis scanner 27 are activated upon receipt of the coordinate data for the points of locus for one graphic element. After the description of that line element is completed, the coordinate data for the next line element are computed and subsequently sent to the X-axis scanner 26 and the Y-axis scanner 27. Both the X-axis scanner 26 and the Y-axis scanner 27 will remain inactive until after the description of the next line element is started and during this inactive period, the laser light will continually be applied on to the start point of the next line element. As a result, the start point of the subsequent graphical element is subjected to a greater degree of laser working than any other points of locus, resulting in nonuniform description of the geometric form.

Consider, for example, the case of describing the geometric form shown in FIG. 6. Since a comparatively long time is taken to compute the coordinate data on the points of locus over the circular arc B–C, laser light scanning will stop at point B after the description of straight line A–B before the description of the circular arc B–C starts in the subsequent step.

As the scanners 26 and 27 come to a stop and then start again, the scanning speed will be decelerated and accelerated. In either period, the amount of laser light will increase to cause a problem of the same nature as described in the preceding paragraphs.

The problem caused by the first method in connection with the computation of coordinate data is lacking in the second approach but, on the other hand, a memory is necessary that has a large enough capacity to store all of the coordinate data on a number of points of locus that comprise each of the line elements to be described.

The second problem to be discussed concerns the deflection scanning with laser light. Since each X-axis scanner 26 and the Y-axis scanner 27 each has scanning optics such as a galvano-mirror having an inertial force, the scanners 26 and 27 will not respond quickly enough to a scan start command. Rather a delay time will occur as determined by the inertial force or the like of the scanning optics. In contrast, the laser source such as a $CO_2$ laser has practically no delay time since it starts to oscillate and emits laser light almost simultaneously with the application of an ON command.

FIG. 11A illustrates how the response of the scanner to a command thereto delays by a given time T when describing a straight line of length L. In the illustrated case, a laser ON command is issued as soon as a scan start command is supplied to the scanners, whereupon the emission of laser light is started. However, as shown by FIG. 11B, the laser light keeps irradiating the same position during the period of the given time T. Thereafter, scanning is started and the laser is turned off at the point of time when the supplied command has reached the target value. However, at that point of time, the laser light is not yet to reach the intended position of irradiation and, hence, the straight line that is actually described by the irradiation with laser light has a length L' which is shorter than the specified length L.

Thus, the conventional laser marking devices have had the disadvantage of being incapable of describing line elements to the correct length.

FIGS. 13A and 13B are comparable to FIGS. 11A and 11B, except that the acceleration and deceleration that accompany the transition of the scanners to a stop mode are taken into account. As soon as the scanners are supplied with a scan start command, a laser ON command is issued to start the application of laser light; however, as FIG. 13B shows, the laser scan speed is slow during the acceleration period and the straight line that is actually described by the irradiation with laser light has a length L' which is shorter than the specified length L.

Consider next the case of describing a geometric form or a character such as "A" (see FIG. 20A). The coordinate data on the locus indicated by a dashed line are computed as the path of scanning with laser light and the X-axis scanner 26 and the Y-axis scanner 27 are controlled for deflection on the basis of those coordinate data. However, as mentioned in the preceding paragraphs, the X-axis scanner 26 and the Y-axis scanner 27 will experience the delay in action on account of inertial force and the like. This has a significant effect in the case where the position signaled to the scanner varies as shown in FIGS. 19A and 19B; if the change in the signaled position is gradual as shown in FIG. 19A, the position of response will reach the target signaled position although there is some delay in the response. On the other hand, if the change in the signaled position is abrupt as shown in FIG. 19B, the position of response will no longer be capable of reaching the target position since the signaled position will change before the position of response reaches the target signaled position.

Referring to the case of describing the character illustrated in FIG. 20A, the signaled position will change abruptly at each position where the locus indicated by dashed line kinks through an acute angle and, hence, the position of response or the position being irradiated with laser light will not be capable of scanning correctly the acute-angled areas as indicated by solid lines in FIG. 20B and the corners of the letter will become round to produce a deformed character.

SUMMARY OF THE INVENTION

A first object, therefore, of the present invention is to provide a laser marking device that enables coordinate data to be computed by a high-speed arithmetic processing operation with a small memory capacity and which also is capable of describing geometric forms by continuous laser light scanning, without interruptions, over a plurality of successive line elements.

A second object of the invention is to provide a laser marking device that is capable of describing line elements in the correct length by synchronizing the laser light scanning with scanners and the oscillation of the laser source during the deflection of laser light for scanning.

A third object of the invention is to provide a laser marking device that is capable of describing characters and symbols correctly by scanning, without errors, the predetermined path to be irradiated with laser light even if there is a delay in the response of the scanners to signaling thereto.

The first laser marking device of the invention has a control system for controlling both the ON/OFF operation of a laser source and the deflecting operation of scanning optics and this control system is comprised of the control means, the first and second memory means and the arithmetic operation means which are individually described below.

The first memory means stores, for each of the line elements that comprise a geometric form, graphic data containing the kind of the graphic of which each line element is a part, as well as the coordinates of the start and end points of each graphic element. The control means retrieves the graphic data from the first memory means and constructs a command instructing the description of a geometric form on the basis of the graphic data. The arithmetic operation means receives the command and constructs, on the basis of the command, coordinate data on a plurality points of on each element which begins at the start point and terminates at the end point, as well as laser ON/OFF data. The second memory means has a large enough capacity to store the coordinate data and the laser ON/OFF data for a predetermined number of the points of the and, in response to a WRITE command from the arithmetic operation means, the second memory means receives the coordinate data and the laser ON/OFF data while outputting the former to the scanning optics and the latter to the laser source at a given speed.

The second laser marking device of the invention has a control system that controls the ON/OFF operation of the laser source and the deflecting operation of the scanning optics on the basis of graphic data on a plurality of line elements that comprise a geometric form. This control system is provided with delay means by which a control signal for controlling the ON/OFF operation of the laser source is delayed with respect to a control signal for controlling the deflecting operation of the scanning optics by the response time of the scanning optics to a command thereto.

The third laser marking device of the invention includes the control system for controlling the ON/OFF operation of the laser source and the deflecting operation of the scanning optics having the following memory means and control means. The memory means stores, for each of the line elements of a geometric form, graphic data containing the kind of the line of which each graphic element is a part, as well as the coordinates of the start and end points of each graphic element. The control means retrieves the graphic data from the memory means and constructs coordinate data on a plurality of points for each graphic element which begins at the start point and terminates at the end point, as well as laser ON/OFF data; the control means sends the coordinate data to the scanning optics and the laser On/OFF data to the laser source. In the case when the directions of two line elements that should be scanned continuously with the laser source change or the lines cross each other, a first additional line that is an extension, in the forward scanning direction by a specified distance, of the end point of the first line element to be scanned first, a second additional line that is an extension, in the backward scanning direction by a specified distance, of the start point of the second line element to be scanned later, and a third additional line that connects the first and second additional lines together are added as supplemental line elements to the geometric form and the memory means stores the graphic data on the geometric form including the at least three additional lines and further stores laser ON/OFF fundamental data that turn off the laser source when the three additional lines are being scanned. The control means constructs the coordinate data and the laser ON/OFF data on the basis of the graphic data and laser ON/OFF fundamental data that have been retrieved from the memory means.

The control means in the first laser making device includes a CPU and other necessary components and constructs a specified command on the basis of the graphic data retrieved from the first memory means. The command has a simple enough content to instruct the kind of the line of which each line element is a part, as well as the coordinates of the start and end points of each graphic element. Therefore it requires only a short processing time to construct the command and other process can be executed after it has been sent out.

The arithmetic operation means includes a graphics describing LSI (GDC) and other necessary components and, in response to the command it receives, the arithmetic operation means executes specified arithmetic operations to construct the coordinate data and laser ON/OFF data. Using hardware such as GDC, the necessary arithmetic operations can be executed at much higher speed compared to CPU-based software processing.

The results of the arithmetic operations are first stored in the second memory means which has a FIFO memory and are then supplied to the scanning optics and laser source at specified rates. As long as the second memory means has a room for accommodating fresh data, the arithmetic operation means outputs a WRITE command to the second memory means so that data can be written into the latter. If the second memory means no longer has a room for accommodating fresh data, the arithmetic operation means stops supplying the data WRITE command and interrupts the arithmetic operation.

Therefore, the second memory means continues to output data at a specified rate irrespective of the status of processing by the arithmetic operation means. As a result, the scanning optics will not stop at any point of time during its operation but it will perform continuous laser light scanning.

In the second laser marking device, the signal for controlling the deflecting operation of the scanning optics is supplied to the laser source without being delayed. By contrast, the signal for controlling the ON/OFF operation of the laser source is supplied to the scanning optics via the delay means. Since the delay time of the delay means is set at a value equal to the response time of the scanning optics to a command thereto, the ON/OFF operation of the laser source is synchronized with the scanning by laser light.

The problem described with reference to FIGS. 20A and 20B occurs to a geometric form in which the directions of two line elements to be scanned continuously with the laser source turn or the lines cross each other. To deal with this problem, the third laser marking device is so adapted that graphic data are preliminarily constructed for a modified geometric form that is prepared by adding the three additional lines to the initial form of the nature just described above and the thus constructed graphic data are stored in the memory means. A merit of this arrangement is that even if there is an error in the position of irradiation with laser light on account of the delay in the response of the scanning optics, the error will be limited to the three additional lines and as regards the line elements to be described by illumination with laser light, the latter will track the same scanning path although there is some delay in response to the scan instruction. The laser source will turn on at the point of time when the scanning path has returned to the initial line elements. As a result, laser light will illuminate only the initial line elements which should constitute the geometric form but will not be applied to any of the three additional lines.

The first memory means in the first laser marking device of the invention needs only to store simple enough graphic data that contain the type of the line of which each graphic element is a part, as well as the coordinates of the start and end points of each graphic element. The second memory means also has no need to store data on all points of locus. Therefore its capacity may be small enough to store data on only a few points, for example, 64 pints, of the locus. As a further advantage, the arithmetic operation means permits faster processing compared with the conventional software-dependent method. What is more, the scanning optics will not stop its operation but executes scanning continuously, thereby assuring uniform marking.

In the second laser marking device of the invention, laser light scanning with the scanner is synchronized with the oscillation of the laser source and this enables a plurality of line elements to be described in the correct length.

Further, the third laser marking device of the invention assures that the predetermined scanning path which is to be illuminated with laser light is scanned without errors, thereby accomplishing correct description of a desired geometric form.

BRIEF DESCRIPTION OF THE DRAWINGS

FIGS. 11A and 11B are graphs illustrating the timing of turning a laser source on or off in the conventional laser marking device and the defect that accompanies it;

FIGS. 12A and 12B are graphs illustrating the timing of turning the laser source on or off in the laser marking device of the invention and the meritorious effect it achieves;

FIGS. 13A and 13B are graphs comparable to FIGS. 11A and 11B, except that the acceleration and deceleration of the scan speed are taken into account;

FIGS. 14A and 14B are graphs comparable to FIG. 12A and 12B, except that the acceleration and deceleration of the scan speed are taken into account;

FIGS. 19A and 19B are graphs showing the relationship between the signaled position of a scanner and its response position;

FIG. 20A is a diagram showing the intended path of scanning with scanners in the conventional laser marking device; and FIG. 20B is a diagram showing the geometric form described by means of the scanners.

DETAILED DESCRIPTION OF THE PREFERRED EMBODIMENTS

Several embodiments of the invention are described below in detail with reference to the accompanying drawings.

Figure 1:
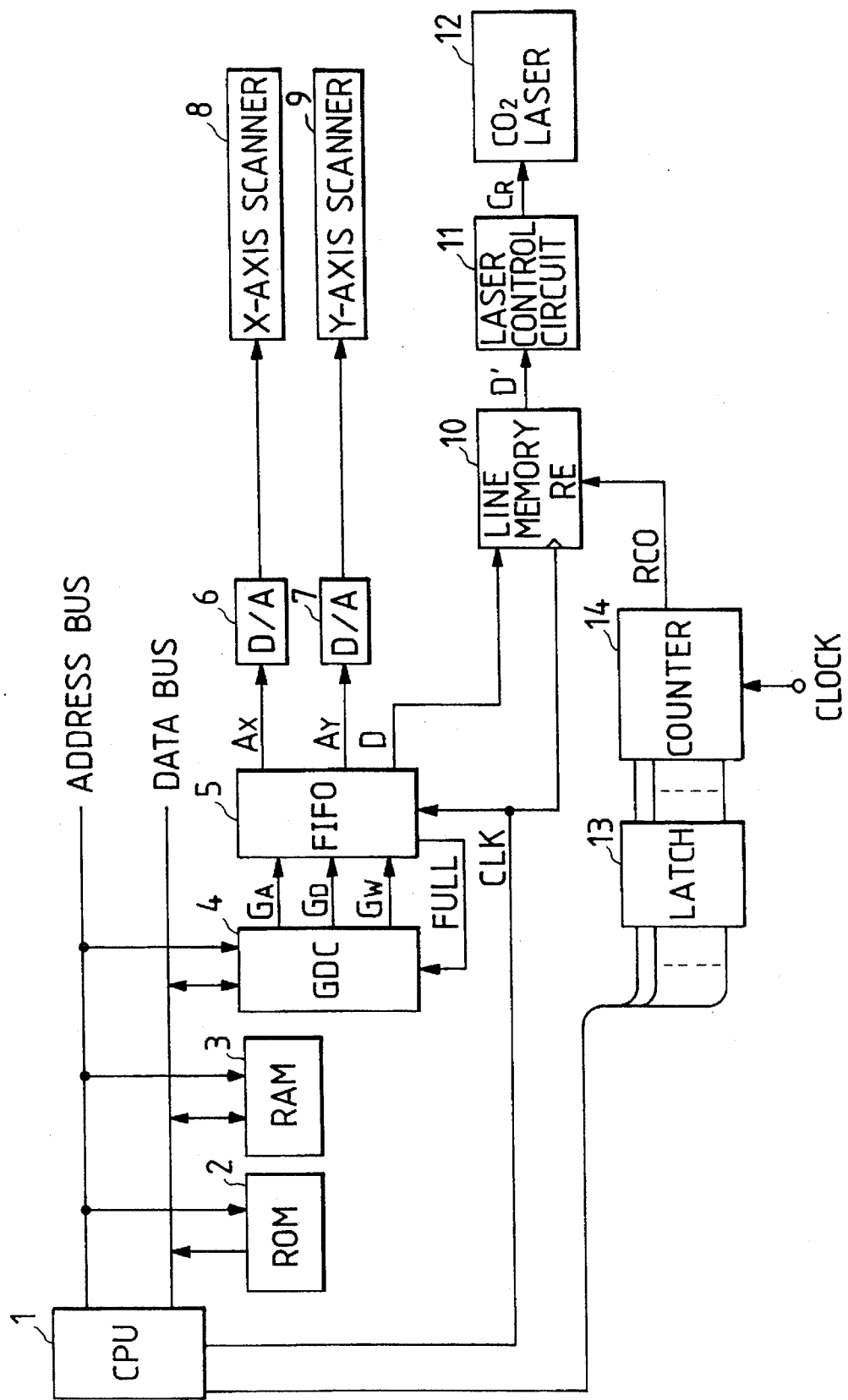
FIG. 1 is a block diagram showing the basic layout of the laser marking device of the invention.

FIG. 1 shows the general layout of the laser marking device of the invention. CPU 1 has an address bus and a data bus, to each of which ROM 2 and RAM 3 are connected. GDC (graphic-display controller) 4 which is an LSI for graphic description is also connected to the buses. An example of GDC 4 that can be used in the invention is µPC 72123 available from NEC Corp.

Figure 6:
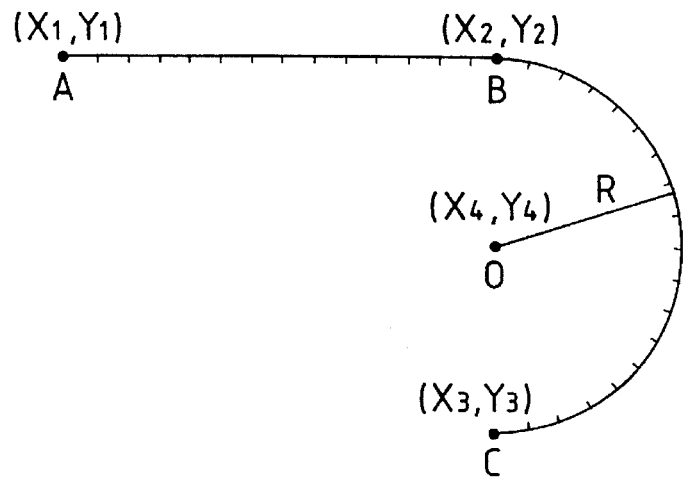
FIG. 6 is a diagram showing two continuous line elements.

ROM 2 has graphic data stored for each of the line elements that will constitute various geometric forms. The stored graphic data comprise the type of the line (e.g., straight line or ellipse) of which each graphic element is a part, the coordinates of the start and end points of each element and, in the case of an ellipse, the coordinates of its center, as well as the lengths of its major and minor axes. Take, for example, the geometric form shown in FIG. 6; the graphic data on that figure contains $(X_1, Y_1)$ as the coordinates of the start point of straight line A–B $(X_2, Y_2)$ as the coordinates of the end point (or start point) of straight line A–B (of elliptical line or circular arc B–C), $(X_3, Y_3)$ as the coordinates of the end point of elliptical line (circular arc) B–C, $(X_4, Y_4)$ as the coordinates of the center of the ellipse, as well as R, the lengths of the major and minor axes of the ellipse. The graphic data further contains laser ON/OFF fundamental data which turns on the laser source at the start point of each line element and turns it off at the end point.

As for characters and symbols, ROM 2 stores modified graphic data, details of which will be discussed later in this specification.

CPU 1 executes the computer program registered in ROM 2, constructs a graphic description command containing the above-mentioned graphic data, and supplies the command to GDC 4. Upon receiving the command for one line element from CPU 1, GDC 4 computes coordinate data for the many points of locus connecting the start and end points of the line element on the basis of the received command while, at the same time, GDC 4 computes laser ON/OFF data corresponding to the points of locus on the basis of the above-mentioned laser ON/OFF fundamental data. If one straight line is to be described, GDC 4 will output data at such a rate that the output time for one set of coordinates is 0.2 µs; obviously, the output speed is much faster than the operating speed of X-axis scanner 8 and Y-axis scanner 9 (to be described later in this specification), which is at least 5.0 µs per set of coordinates.

The coordinate data and laser ON/OFF data that have been computed with GDC 4 are each sent to a FIFO memory 5 via graphic address bus $G_A$ and graphic data bus $G_D$.

Figure 3:
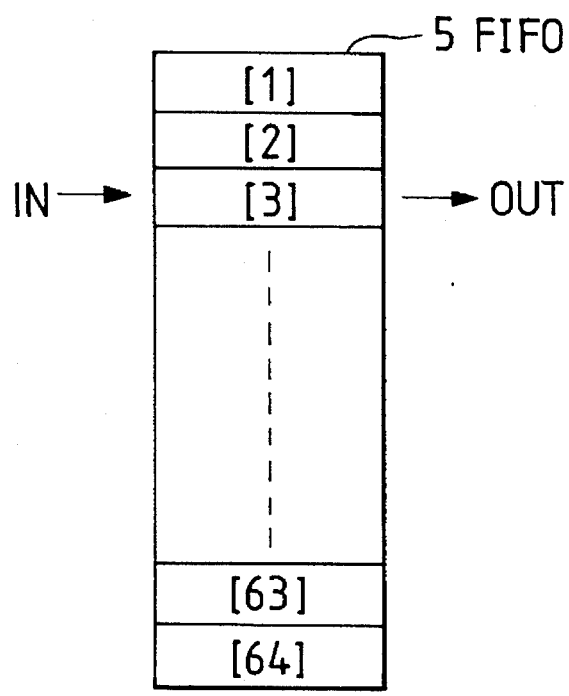
FIG. 3 is a diagram showing the data storage area of the FIFO memory.

As shown in FIG. 3, FIFO memory 5 has a sufficient capacity to store data on 64 points of locus and the individual pieces of data are stored consecutively at the indicated addresses (1) to (64) and will be retrieved sequentially at a rate as determined by a clock CLK being supplied from CPU 1. FIFO memory 5 performs the writing of input data in response to a WRITE command $G_W$ from GDC 4. When there is no vacancy in the storage region for accommodating any fresh input data, the FIFO memory 5 sends a FULL signal back to GDC 4, thereby interrupting the arithmetic operation being conducted by the latter.

Figure 2:
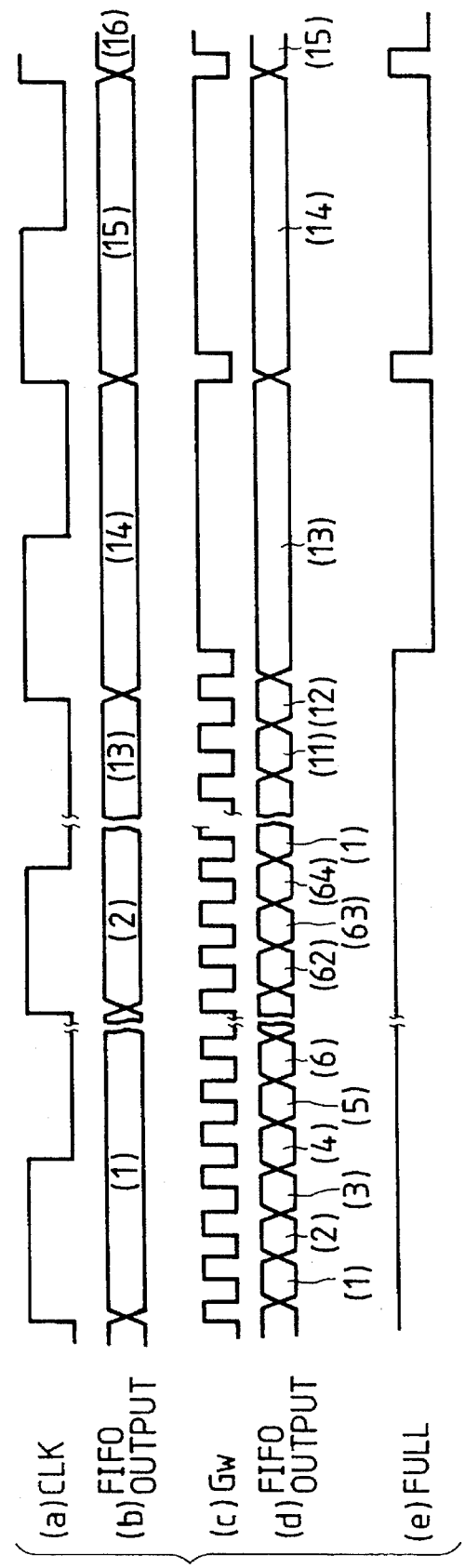
FIG. 2 is a timing chart for data entry and exit from the FIFO memory which is a component of the laser marking device shown in FIG. 1.

FIG. 2 is a timing chart for data entry and exit from FIFO memory 5. FIFO memory 5 outputs data at a constant speed synchronized with the clock CLK from CPU 1. GDC 4 allows data to be entered into FIFO memory 5 synchronized with the WRITE command $G_W$ being supplied from GDC 4 to FIFO memory 5. If, in this process, data are entered up to address (13) while data are being retrieved from address 14 as shown in FIG. 2, the FIFO memory 5 is no longer capable of accommodating fresh data entry and, hence, the FULL signal shifts to LOW level and a STANDBY command is issued to GDC 4. If data are thereafter retrieved from address 15, the FULL signal shifts to HIGH level, whereupon GDC 4 resumes the arithmetic operation. This permits fresh data to be entered at address 14.

Thus, FIFO memory 5 outputs data at a constant rate and the coordinate data for the direction of X-axis are supplied to X-axis scanner 8 via D/A converter 6 whereas the coordinate data for the direction of Y-axis are supplied to Y-axis scanner 9 via D/A converter 7. As a result, X-axis scanner 8 and Y-axis scanner 9 will deflect laser light for scanning in accordance with the rate of data output from FIFO memory 5.

The laser ON/OFF data D retrieved from FIFO memory 5 are passed to a line memory 10 with a delay mode and thence supplied to a laser control circuit 11.

Figure 10:
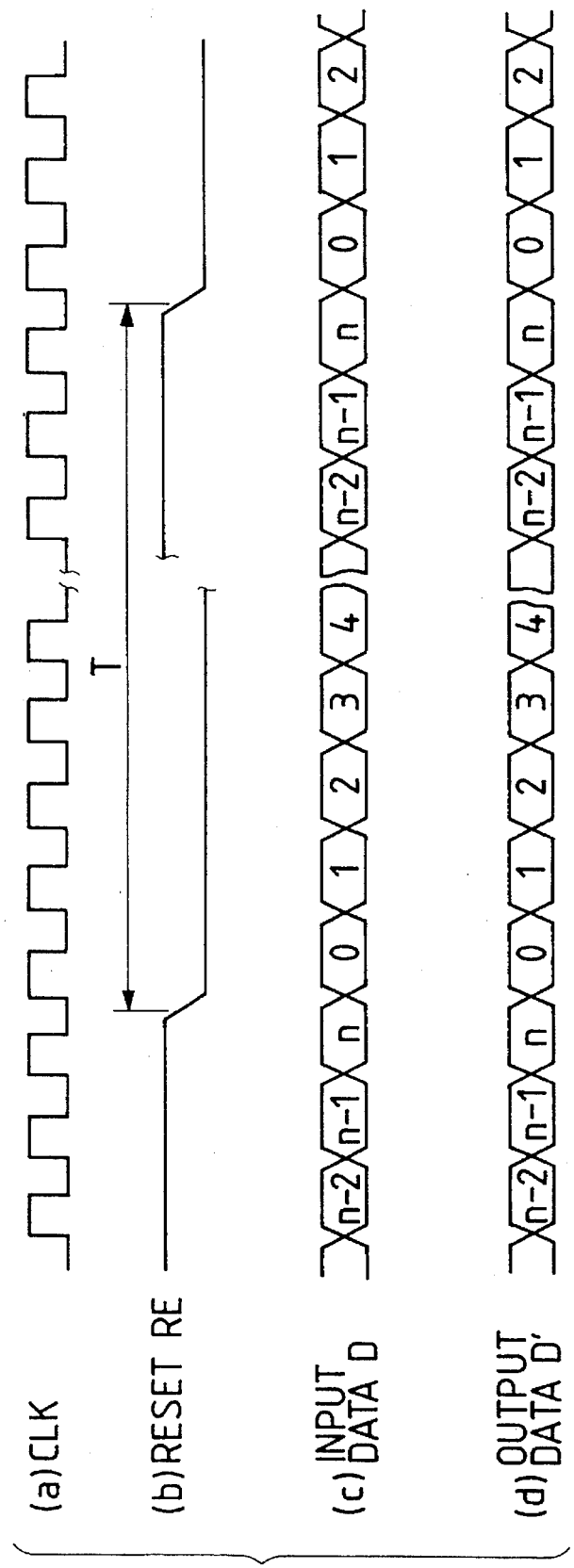
FIG. 10 is a timing chart for data entry and exit from the line memory which is a component of the laser marking device shown in FIG. 1.

FIG. 10 shows the time relationship between data entry and exit for the line memory 10. As shown, previously written data are delivered from a certain address in line memory 10 synchronized with clock CLK, whereupon the present data are simultaneously entered at that address. If, in this process, a reset signal RE is entered at period T (say, 1 ms), the entered data will be delivered from the line memory 10 after being delayed by period T.

The reset signal RE is prepared in a circuit that includes a latch circuit 13 and an 8-bit counter 14, both of which are shown in FIG. 1. The latch circuit 13 has latched therein specified data (e.g., "156" in decimal notation) that has been set by means of CPU 1. In response to the supply of that data, counter 14 uses it as an initial value and counts up at an interval, typically determined by 1 MHz clock. When a specified count (say, "255" in decimal notation) is exceeded, the counter 14 itself is reset to the initial-value data by RCO (ripple carryout) and, at the same time, the reset signal RE is supplied to the line memory 10. In the case under consideration, the reset signal is issued at every 100 clocks (100 µs).

Therefore, the delay time in association with the line memory 10 can be set variably by updating the data entry into the counter 14 by means of CPU 1. In the embodiment under consideration, the delay time is set to be equal to the response delay time T of the scanners 8 and 9.

Delayed data D' emerging from the line memory 10 is supplied to the laser control circuit 11, in which it is converted to a laser control signal $C_R$ which, in turn, is delivered to a $CO_2$ laser 12.

Figure 4:
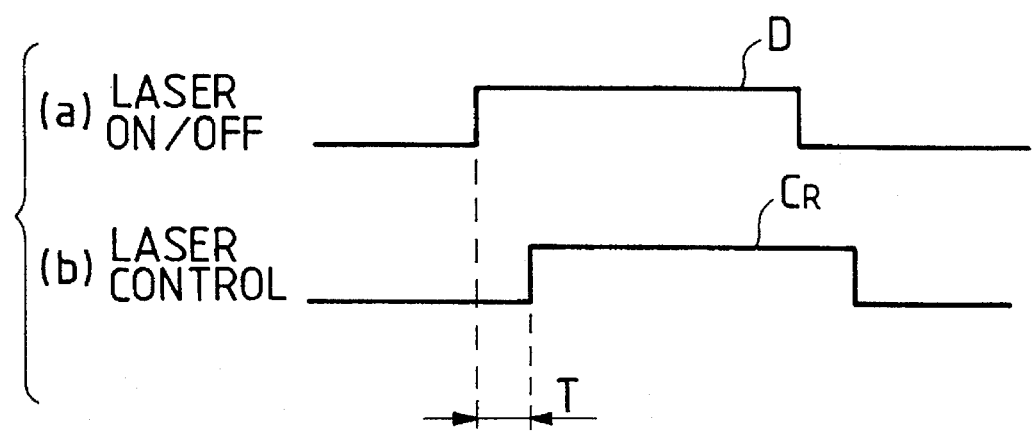
FIG. 4 is a timing chart for laser ON/OFF data and laser control signal.
Figure 5:
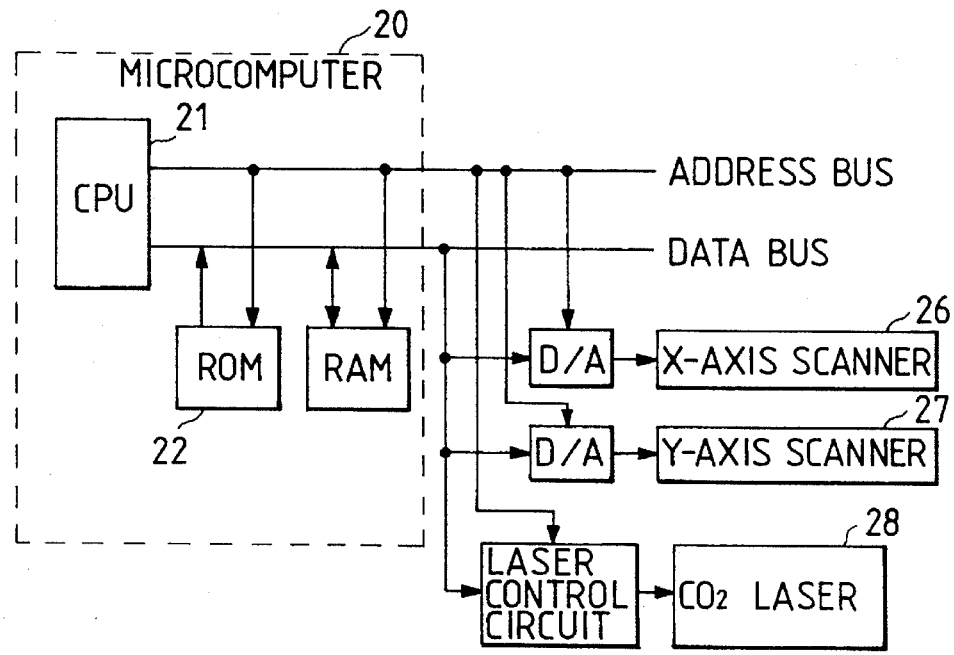
FIG. 5 is a block diagram showing the basic layout of a conventional laser marking device.

FIG. 4 illustrates the phase difference between the laser ON/OFF data D which is not yet to be delayed in line memory 10 and the laser control signal $C_R$ which has been prepared after delay. Obviously, the laser control signal $C_R$ lags behind the laser ON/OFF data D by the response delay time T of scanners 8 and 9.

Hence, the time at which either scanner 8 or 9 starts to operate in response to a scan start command will coincide with the time at which the laser source is turned on or off.

Consider, for example, the case of describing a straight line with length L. As soon as the scanner starts to respond to a scan start command, a laser ON command is issued to start application of laser light and at a later point of time when the response has reached the target value, the laser source is turned off (see FIG. 12A). Hence, the illuminating laser light will describe the correct length L of the straight line (see FIG. 12B).

FIGS. 14A and 14B are comparable to FIGS. 12A and 12B, except that the acceleration and deceleration that accompany laser scanning are taken into account. The scanner starts to respond to a scan start command and as soon as the response speed has reached a constant level, a laser ON command is issued to start application of laser light and at a later point of time when the response has reached the target value, the laser source is turned off. Hence, the illuminating laser will describe the correct length L of the straight line.

Figure 7:
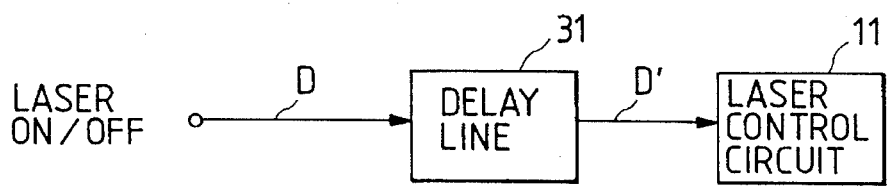
FIG. 7 is a block diagram showing another layout of the delay means which is a component of the laser marking device shown in FIG. 1.

In the embodiment shown in FIG. 1, the delay means has line memory 10. However, this is not the sole case of the invention and the delay means may include a delay line 31 as shown in FIG. 7.

Figure 8:
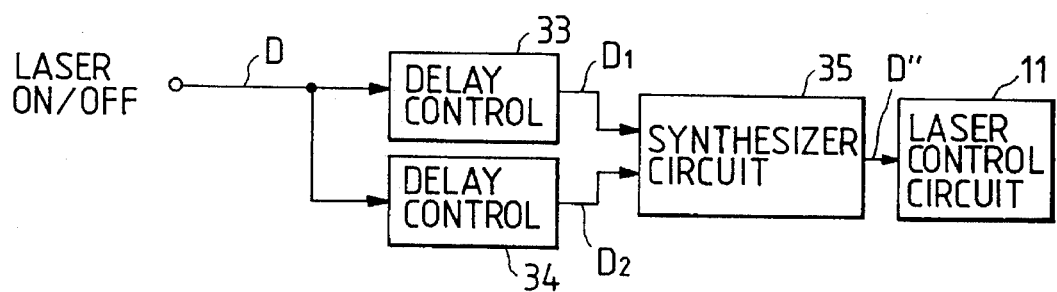
FIG. 8 is a block diagram showing still another layout of the delay means.
Figure 9:
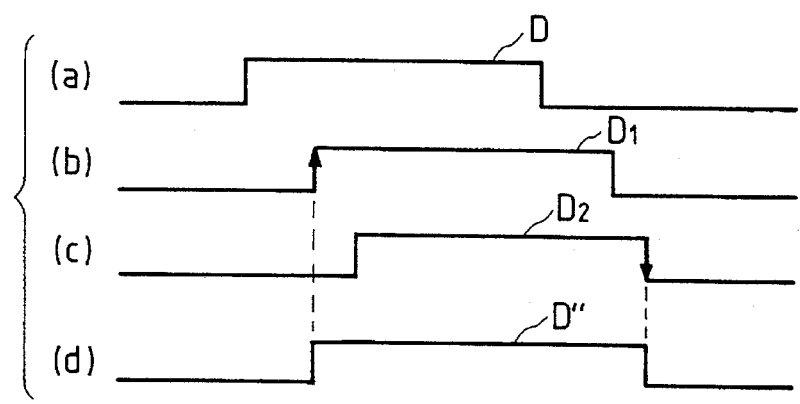
FIG. 9 is a timing chart for the signals generated in the circuit shown in FIG. 8.

Another version of the delay means is shown in FIGS. 8 and 9. The circuit shown in FIG. 8 uses two delay control circuits 33 and 34 having different delay times to construct a laser ON timing signal $D_1$ and a laser OFF timing signal $D_2$ that have different phases and which are subsequently supplied to a synthesizer circuit 35 to produce delay controlled data D" that rises in synchronism with the rising of the laser ON timing signal $D_1$ and which later falls in synchronism with the falling of the laser OFF timing signal $D_2$. With the circuit shown in FIG. 8, the timing of turning the laser source on can be controlled independently of the timing of turning off the laser source.

We will now describe in detail the graphic data stored in ROM 2 as it is shown in FIG. 1. As already mentioned, the ROM 2 stores the necessary data for describing a geometric form by application of laser light, such as the coordinates of the start and end points of each of the line elements that constitute the figure. In the embodiment under consideration, the problem described with reference to FIGS. 19A to 20B, i.e., the deformation of a character or symbol owing to the delayed response of X-axis scanner 8 or Y-axis scanner 9 to a scan start command, is especially addressed. To solve this problem, an appropriately modified geometric form is constructed and graphic data on that modified figure are stored in ROM 2.

The problem at issue occurs to a geometric form in which the two line elements to be scanned continuously, with the laser source turned on, cross each other as shown in FIGS. 20A and 20B. To deal with this problem, three additional lines, the first being an extension, in the forward scanning direction by a specified distance, of the end point of the first line element to be scanned first, the second being an extension, in the backward direction by a specified distance, of the start point of the second line to be scanned later, and the third being a line that connects the first and second additional lines together, are added as supplemental line elements to the initial geometric form of the nature just mentioned above.

Take, for example, the case of describing the letter "A". In connection with two continuous line elements 2–3 and 6–7, the following three additional line are added to the original geometric form shown in FIG. 15: the first additional line 3–4 which is an extension, in the forward scanning direction by a specified distance, of the end point 3 of the line element to be scanned first; the second additional line 5–6 which is an extension, in the backward scanning direction by a specified distance, of the start point 6 of the line element to be scanned next; and the third additional line 4–5 which connects the first and second additional lines together. Similarly, in connection with two continuous line elements 6–7 and 10–11, a first additional line 7–8, a second additional line 9–10 and a third additional line 8–9 are added. Further, in order to provide smooth connection to the letters (not shown), one preceding and the other following the letter "A", a second additional line 1–2 and a first additional line 11–12 are added.

The lengths of the first and second additional lines can be preliminarily determined in each case in accordance with the distance to be covered by scanning laser light within the delay time of scanner's response to a scan start command.

Figures 15, 16:
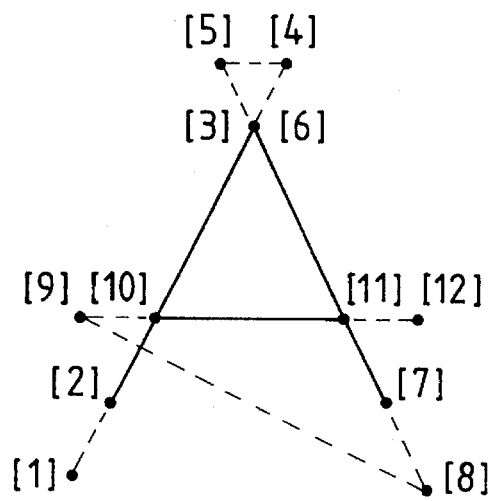
FIG. 15 is a diagram showing exemplary line elements as part of the graphic data stored in the ROM which is a component of the laser marking device shown in FIG. 1.
FIG. 16 is a diagram showing the stored data in the ROM.

FIG. 16 shows the content of the modified graphic data stored in ROM 2 in association with the letter "A". The stored data comprises the coordinate data on the start and end points 1 to 12 of all line elements including the three kinds of additional lines just described above, the laser ON/OFF data using those points as start points, and the type of the line of which each of the line elements to be described using those points as start points.

Figure 17:
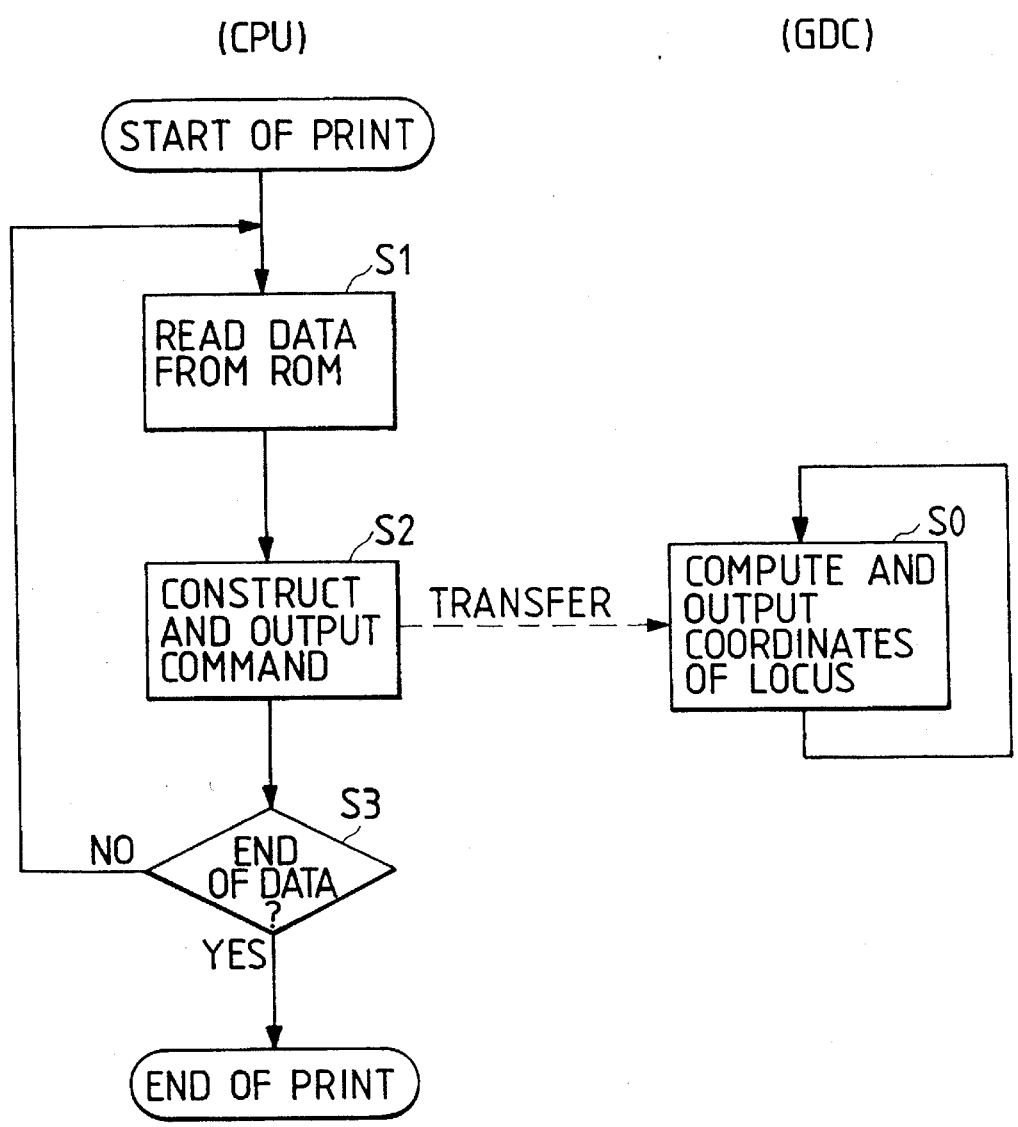
FIG. 17 is a flowchart showing the operations performed by the CPU and GDC which are components of the laser marking device shown in FIG. 1.

When a print start command is issued (see FIG. 17), CPU 1 reads graphic data from ROM 2 in step S1 in connection with a single line element to be described and constructs a command containing the graphic data and scaling information in step S2, and supplies it to GDC 4. Thereafter, CPU 1 checks if the reading of data on all line elements has ended in step S3; if the result is negative, the routine returns to step S1. If the reading of all data has ended, the printing operation ends.

After receiving the command from CPU 1, GDC 4 computes the coordinate data on the points of locus that begins at the start point and terminates at the end point with respect to the line elements containing the above-mentioned three kinds of additional lines, and iterates step SO for outputting the coordinate data and laser ON/OFF data to the FIFO memory 5.

Figure 18A:
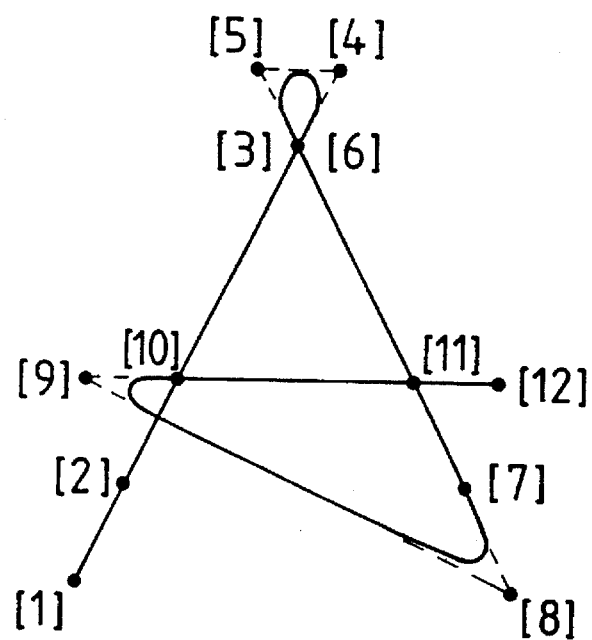
FIG. 18A is a diagram showing the path of scanning with the scanners which are components of the laser marking device shown in FIG. 1.

If the letter to be described is "A", the above operation will produce such a result that although the scanning path to be followed by the scanner in response to a scan start command is as indicated by dashed lines in FIG. 18A, the delay in scanner's response will cause it to scan the path which, as indicated by solid lines, is somewhat round at the corners, whereby the actual scanning path will depart from the intended path with respect to the additional lines. However, during the period of scanning the additional lines, the laser source is turned off to interrupt the application of laser light and it will turn on during the period while the scanners are brought back to the mode in which they scan the initial line elements.

Figure 18B:
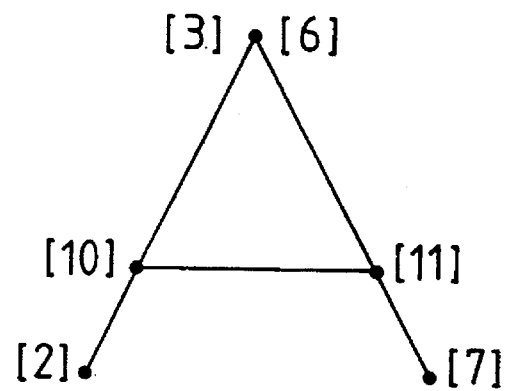
FIG. 18B is a diagram showing the geometric form described by means of the scanners.

As a result, the correct letter can be described as shown in FIG. 18B.

As described above, ROM 2 in the laser marking device of the embodiment shown in FIG. 1 needs only to store simple graphic data that contain the kind of the line of which each graphic element is a part, as well as the coordinates of the start and end points of each line element. In addition, FIFO memory 5 needs only to store the coordinate data for no more than about 64 points of locus. Hence, the overall memory capacity that is necessary in the laser marking device is very small. Further, GDC 4 permits faster processing compared with the conventional software-dependent arithmetic operation by means of CPU 1. In addition, the X-axis scanner 8 and the Y-axis scanner 9 will not stop their operation but perform scanning continuously, thereby assuring that marking is accomplished at uniform density or depth of working.

It should also be noted that since laser light scanning with the scanners 8 and 9 is synchronized with the oscillation of the $CO_2$ laser 12, all line elements can be described in the correct length. A further advantage is that even in the case of describing letters and symbols, the predetermined scanning path which is to be illuminated with laser light can be scanned without errors, thereby accomplishing correct description in the intended manner.

While several embodiments of the invention have been described above, it should be understood that they are given for illustrative purposes only and that they are by no means intended to limit or restrict the claimed scope of the invention. Further, as will be readily apparent to one skilled in the art, the layout of the components in the laser marking device of the invention is by no means limited to the embodiments described above and various design modifications and alterations are of course possible without departing from the scope of the present invention.

What is claimed is:

1. A laser marking device for describing geometric forms, including at least one graphic element, on a surface that is being irradiated with laser light using two-dimensional scanning, said device comprising:

a laser source;

scanning optics for deflecting laser light from said laser source; and a control system for controlling the ON/OFF operation of said laser source and the deflecting operation of the scanning optics, said control system further comprising:

a first memory means for storing graphic data including: a classification for each graphic element, coordinates of start and end points for each graphic element, and laser ON/OFF fundamental data for each graphic element;

control means for retrieving the graphic data from the first memory means and sending a command for constructing a description of the geometric forms based on the graphic data;

an arithmetic operation means for receiving the command, and constructing coordinate data for a plurality of locus points for each graphic element which begins at the start point and terminates at the end point and constructing laser ON/OFF data for the locus points on the basis of the laser ON/OFF fundamental data; and a second memory means having a capacity sufficient to store the coordinate data and the laser ON/OFF data for a plurality of locus points, wherein said second memory means, responsive to a first signal outputs the stored coordinate data to the scanning optics and the laser ON/OFF data to said laser source at a predetermined speed and, responsive to a second signal from said arithmetic operation means receives additional coordinate data and the laser ON/OFF data from said arithmetic operation means.

2. A laser marking device according to claim 1, further comprising a delay means for outputting the laser ON/OFF data after a delay substantially corresponding to the response time of said scanning optics to a deflecting command sent to said scanning optics, said delay means being provided between said second memory means and said laser source.

3. A laser marking device according to claim 1, wherein in the case where two graphic elements form an angle, said arithmetic operation means constructs additional graphic elements wherein a first additional graphic element is formed as an extension in the forward scanning direction by a specified distance of the end point of the first graphic element, a second additional graphic element is formed as an extension in the backward scanning direction by a specified distance of the start point of the second graphic element, and a third additional graphic element is formed that connects the first and second additional graphic elements together; and wherein said first memory means stores the graphic data, including said at least three additional graphic elements, and further stores the laser ON/OFF fundamental data which turn off the laser source when said three additional graphic elements are being formed.

4. A laser marking device for describing geometric forms, including at least one graphic element, on a surface that is being irradiated with a laser light using two-dimensional scanning, said device comprising:

a laser source;

scanning optics for deflecting the laser light from said laser source; and a control system for controlling the ON/OFF operation of said laser source and the deflecting operation of said scanning optics based on graphic data for each graphic element of the geometric form, said control system further comprising, a delay means by which a control signal for controlling the ON/OFF operation of said laser source is delayed to substantially correspond with a delay time in the mechanical response of the scanning optics, due to inertia of the scanning optics, to a deflecting command sent to said scanning optics, to coordinate the operation of said laser source with the scanning optics.

5. A laser marking device according to claim 2 wherein the control system further comprises:

a first memory means which stores, for each graphic elements of each geometric form, graphic data including a classification of each graphic element, the coordinates of the start and end points of each graphic element, and laser ON/OFF fundamental data of each graphic element;

control means for retrieving the graphic data from the first memory means and for constructing, based on the graphic data, coordinate data for a plurality of locus points for each graphic element which begins at the start point and terminates at the end point and for constructing laser ON/OFF data corresponding to the locus point based on the laser ON/OFF fundamental data; and second memory means having a capacity sufficient to store the coordinate data and laser ON/OFF data for a plurality of locus points, wherein said second memory means, responsive to a WRITE command from said control means outputs the stored coordinate data to said scanning optics and said laser ON/OFF data to said delay means at a predetermined speed, and receives additional coordinate data and the laser ON/OFF data from said control means.

6. A laser marking device for describing geometric forms, including a plurality of graphic elements, on a surface that is being irradiated with laser light using two-dimensional scanning, said device comprising:

a laser source;

scanning optics for deflecting the laser light from said laser source; and a control system for controlling the ON/OFF operation of the laser source and the deflecting operation of the scanning optics, said control system further comprising:

a memory means for storing graphic data including: a classification of each graphic element, coordinates of start and end points of each graphic element, and laser ON/OFF fundamental data for each graphic element; and a control means for retrieving the graphic data from the memory means and for constructing, based on the graphic data, coordinate data for a plurality of locus points for each graphic element which begins at the start point and terminates at the end point, laser ON/OFF data corresponding to the locus points based on the said laser ON/OFF fundamental data, while outputting the coordinate data to the scanning optics and the laser ON/OFF data to the laser source;

wherein in the case where two graphic elements form an angle, said control means constructs additional graphic elements wherein a first additional graphic element is formed as an extension in the forward scanning direction by a specified distance from the end point of the first graphic element, a second additional graphic element is formed as an extension in the backward scanning direction by a specified distance from the start point of the second graphic element, and a third additional graphic element is formed that connects the first and second additional graphic elements together; and wherein the memory means stores the graphic data for the geometric form, including said at least three additional graphic elements, and further stores the laser ON/OFF fundamental data which turn off the laser source when said three additional graphic elements are being formed.

7. A laser marking device according to claim 6, wherein said control means further comprises: a second memory means having capacity sufficient to store the coordinate data and laser ON/OFF data for a plurality of locus points, wherein said second memory means, responsive to a signal from said control means outputs said coordinate and ON/OFF data at a predetermined speed, and receives additional coordinate data and laser ON/OFF data from said control means.

8. A laser marking device according to claim 6, wherein said control means further comprises: a delay means for delaying the laser ON/OFF data by a delay substantially corresponding to a response time of said scanning optics to a deflecting command sent to said scanning optics.

9. A laser marking device for describing geometric forms, including a plurality of graphic elements, on a surface that is being irradiated with laser light using two-dimensional scanning, said laser marking device comprising:

a laser source;

scanning optics for deflecting laser light from said laser source; and a control system for controlling the ON/OFF operation of said laser source and the deflecting operation of the scanning optics, said control system further comprising:

a first memory means for storing graphic data including a classification for each graphic element, coordinates of the start and end points for each graphic element, and laser ON/OFF fundamental data;

control means for retrieving the graphic data from said first memory means and sending a command for constructing a description of each of geometric forms based on the graphic data;

an arithmetic operation means for receiving said command and for constructing coordinate data for a plurality of locus points for each graphic element which begins at the start point and terminates at the end point, and for constructing laser ON/OFF data corresponding to the locus points based on the laser ON/off fundamental data;

a second memory means having a capacity sufficient to store the coordinate data and laser ON/OFF data for a plurality of locus points, wherein said second memory means, responsive a first signal from said arithmetic operation means receives the coordinate data and the laser ON/OFF data and responsive to a second signal outputs said stored coordinate and ON/OFF data at a predetermined speed; and a delay means for delaying the laser ON/OFF data in the laser substantially corresponding to a response time of said scanning optics to a deflecting command sent to said scanning optics;

wherein the coordinate data delivered from said second memory means are sent to said scanning optics and the laser ON/OFF data are sent to said laser source via said delay means;

wherein in the case where two graphic elements form an angle, said arithmetic operating means constructs additional graphic elements wherein a first additional graphic element is formed as an extension in the forward scanning direction by a specified distance of the end point of a first graphic element, a second additional graphic element is formed as an extension in the backward scanning direction by a specified distance of the start point of the second graphic element, and a third additional graphic element is formed that connects the first and second additional graphic elements together; and wherein the first memory means stores the graphic data including said at least three additional graphic elements and further stores the laser ON/off fundamental data which turn off the laser source when said three additional graphic elements are being formed.

* * * * *